(12) United States Patent
Brabec

(10) Patent No.: US 8,736,609 B2
(45) Date of Patent: May 27, 2014

(54) METHOD AND DEVICE FOR VISUALIZING SURFACE-LIKE STRUCTURES IN VOLUMETRIC DATA SETS

(75) Inventor: Stefan Brabec, Starnberg (DE)

(73) Assignee: Tomtec Imaging Systems GmbH (DE)

( * ) Notice: Subject to any disclaimer, the term of this patent is extended or adjusted under 35 U.S.C. 154(b) by 489 days.

(21) Appl. No.: 12/917,608

(22) Filed: Nov. 2, 2010

(65) Prior Publication Data

US 2011/0102435 A1    May 5, 2011

(30) Foreign Application Priority Data

Nov. 4, 2009 (EP) .................................... 09175037

(51) Int. Cl.
*G06T 15/50* (2011.01)
*G06T 15/80* (2011.01)
*G06T 17/00* (2006.01)
*G06T 15/83* (2011.01)

(52) U.S. Cl.
USPC ........................................ 345/426; 345/428

(58) Field of Classification Search
USPC ......................................... 345/419, 426, 428
See application file for complete search history.

(56) References Cited

U.S. PATENT DOCUMENTS

| | | | | |
|---|---|---|---|---|
| 6,234,968 B1 * | 5/2001 | Sumanaweera et al. | ...... | 600/443 |
| 6,606,089 B1 * | 8/2003 | Margadant | ..................... | 345/419 |
| 6,614,431 B1 * | 9/2003 | Collodi | .......................... | 345/426 |
| 6,922,193 B2 * | 7/2005 | Ritter | ............................ | 345/426 |
| 7,037,263 B2 | 5/2006 | Sumanaweera | | |
| 8,189,002 B1 * | 5/2012 | Westerhoff et al. | ........... | 345/426 |
| 2002/0030681 A1 * | 3/2002 | Ritter | ............................ | 345/426 |
| 2005/0043619 A1 | 2/2005 | Sumanaweera | | |
| 2005/0253841 A1 | 11/2005 | Brabec | | |

FOREIGN PATENT DOCUMENTS

| | | |
|---|---|---|
| EP | 1793350 A1 | 6/2007 |
| JP | 2003061956 | 3/2003 |

OTHER PUBLICATIONS

Lindholm, E., Kilgard, M. J., & Moreton, H. (Aug. 2001). A user-programmable vertex engine. In Proceedings of the 28th annual conference on Computer graphics and interactive techniques (pp. 149-158). ACM.*

(Continued)

*Primary Examiner* — Ulka Chauhan
*Assistant Examiner* — Roberta D Prendergast
(74) *Attorney, Agent, or Firm* — Cantor Colburn LLP

(57) ABSTRACT

The present invention relates to a method and a device for visualizing surface-like structures in volumetric data sets, including defining local coordinate systems at sample points of the volumetric data set, transforming external parameters from a global coordinate system into the local coordinate systems, calculating the gradient vector components ($G_{ai}$, $G_{bi}$, $G_{ci}$) within the local coordinate systems of the sample points, and using the gradient vector components ($G_{ai}$, $G_{bi}$, $G_{ci}$) for calculating a surface normal at a given position of the volumetric data set, where the surface normal is important for conventional illumination models such as the Blinn-Phong shading model, preferably, the present invention is also calculating the external parameters from the global coordinate system at the given position by using the transformed external parameters of the local coordinate systems of the sample points, where the shading or illumination at the given position is then done by using a conventional illumination model, thereby using the calculated surface normal at the given position and the calculated external parameters at the given position.

16 Claims, 2 Drawing Sheets

(56) References Cited

OTHER PUBLICATIONS

Lorensen, W. E., & Cline, H. E. (Aug. 1987). Marching cubes: A high resolution 3D surface construction algorithm. In ACM Siggraph Computer Graphics (vol. 21, No. 4, pp. 163-169). ACM.*

Pfister, H., Hardenbergh, J., Knittel, J., Lauer, H., & Seiler, L. (Jul. 1999). The VolumePro real-time ray-casting system. In Proceedings of the 26th annual conference on Computer graphics and interactive techniques (pp. 251-260). ACM Press/Addison-Wesley Publishing Co.*

Wu, Y., Bhatia, V., Lauer, H., & Seiler, L. (Apr. 2003). Shear-image order ray casting volume rendering. In Proceedings of the 2003 symposium on Interactive 3D graphics (pp. 152-162). ACM.*

European Search Report EP 09 17 5037; Dated Feb. 22, 2010.

H.E Cline, "3D Reconstruction of the Brain From Magnetic Resonance Images Using a Connectivity Algorithm", Magnetic Resonance Imaging, vol. 5, pp. 345-352, 1987.

Hanspeter Pfister, "Gradient Estimation and Sheared Interpolation for the Cube Archtechture", Computer Graphics, vol. 19, No. 5 pp. 667-677, 1995.

* cited by examiner

METHOD AND DEVICE FOR VISUALIZING SURFACE-LIKE STRUCTURES IN VOLUMETRIC DATA SETS

TECHNICAL FIELD

The present invention relates to a method and a device for visualizing surface-like structures in volumetric data sets, such as volume rendering, especially for illuminating these surface-like structures, especially for real-time rendering of sampled data from ultrasound data acquisition. The present invention specifically relates to three-dimensional medical imaging, where two-dimensional images are volume-rendered from three-dimensional data volumes.

BACKGROUND

Three-dimensional ultrasound imaging but also CT or MR imaging generates three-dimensional data which is usually formatted in a coordinate system which is not a Cartesian coordinate system. Such non-Cartesian grid is e.g. an acoustic grid of an ultrasound probe which obtains images of e.g. the heart of a human being. Such data, which represents a volume, is usually scan-converted along the Cartesian coordinate system before being volume-rendered. When displaying the object scanned, it is necessary to display a surface of the object, wherein such surface shall be displayed "as natural as possible". One way to do that is to use a virtual external light source and to incorporate the contribution of such external light source into the volume-rendering integral. Such three-dimensional shading is used to render such three-dimensional data set, thereby using application programming interfaces such as OpenGL or DirectX.

For these illumination models such as the Blinn-Phong shading model, it is usually necessary to define a surface normal in order to evaluate the shading model at a specific position. The Blinn-Phong shading model is a modification of the Phong reflection model and is carried out on each point of the surface to be displayed. For this and other shading models it is usually necessary to define the light vector and the surface normal of a specific position of such surface in order to calculate the diffuse reflection and further vectors (such as the eye vector or the camera vector) in order to calculate the specular reflection.

A common way to approximate the surface normal on a specific position is to use a finite differencing scheme such as forward, backward or central differencing. For volumetric data such surface normal is often calculated using the finite difference in all three dimensions (spatial derivatives) also called the spatial gradient vector:

$$\vec{g} = \begin{pmatrix} \frac{f(x+h, y, z) - f(x-h, y, z)}{2h} \\ \frac{f(x, y+h, z) - f(x, y-h, z)}{2h} \\ \frac{f(x, y, z+h) - f(x, y, z-h)}{2h} \end{pmatrix} \quad \text{Formula 1}$$

The gradient of the scalar field is the direction of highest change, so the surface normal of the isosurface at a certain position is equal to the normalized gradient:

$$\vec{n} = \frac{\vec{g}}{|\vec{g}|} \quad \text{Formula 2}$$

In order to calculate the gradient of a sampled data volume, a cheap and quick method is to calculate the central differences, thereby using the neighbouring grid values. That is shown in FIG. 1 of the present application:

FIG. 1 shows the apex A of the acoustic probe which is sending out beams 1 such as ultrasound beams in order to obtain two-dimensional cross-sectional images of an object to be scanned, such as the heart of a human being. In order to calculate the gradient G at a certain sample point P (here: only a two-dimensional calculation is shown for the better understanding of the present invention), it is necessary to calculate the two gradient components $G_a$ and $G_b$, wherein a and b are the axes of a local (finite) coordinate system:

$$G_a = (f(P_{+x}) - f(P_{-x}))/2$$

$$G_b = (f(P_{-y}) - f(P_{+y}))/2 \quad \text{Formula 3}$$

In a three-dimensional volumetric data set it is clear that it is then necessary to evaluate f, which samples the three-dimensional volumetric data, at six positions. Together with the center sample f(P), which shall be used for the shading task, it is necessary to conduct seven evaluations of f for each shaded position, e.g. each voxel in the 3D voxel space.

It is known in prior art to speed up such calculation by pre-computing the gradient vectors at each discrete position. At each discrete voxel position in a three-dimensional Cartesian coordinate system, the differences are computed and stored together with the original scalar value in a 4-tuple vector ($G_a$, $G_b$, $G_c$, f). In terms of performance, that reduces the number of look-ups when shading a surface within such three-dimensional voxel space by just using the gradient vector components and the scalar value so that it is possible to illuminate these positions by using the pre-calculated 4-tuple vector. The main drawback, however, is the increased data size. The volume data is expanded by at least the factor 4 which easily becomes a problem on machines with a low amount of memory.

For non-Cartesian data, the numerical computation of spatial derivatives (the gradient) and the resultant surface normal becomes more complicated: lighting calculations are based on a global Cartesian coordinate system, wherein light source, viewers position (camera position) etc. are given in such Cartesian coordinate system. Several shading models, such as Blinn-Phong or Phong all use Cartesian coordinate systems for shading calculation.

For non-Cartesian data such as ultrasound data, which is e.g. given in so-called acoustic coordinates, it is not possible to directly use models such as Blinn-Phong or the Phong reflection model thereby using the gradient vector as mentioned above at a given sample position, thereby using any of the differencing schemes mentioned above. This is due to the fact that the coordinate system is not a Cartesian coordinate system. That is also shown in FIG. 1. The local coordinate system with axis a and axis b will not give the correct gradient vector component in direction a, because the values $f(P_{+x})$ and $f(P_{-x})$ are not lying in such space. Hence, in order to calculate the gradient vector G, it would be necessary to first re-sample the three-dimensional data set into a Cartesian coordinate system in order to then compute the gradient components, which is then given in the global Cartesian coordinate system.

A different approach is given in U.S. Pat. No. 7,037,263 B2, where the gradient is first determined from data in the acoustic domain and then transformed to the Cartesian coordinate or display screen domain. A transformation matrix is specified for each position within the sampled three-dimensional acoustic data. The above-mentioned solution requires an expensive re-sampling step to a Cartesian geometry.

BRIEF SUMMARY

The invention provides a method and a device for visualizing surface-like structures in volumetric data sets which are not given in a Cartesian coordinate system, thereby enabling the use of known illumination or shading models. Specifically, the present invention shall give a solution to fast gradient computation and surface lighting for real-time, graphic processing unit based volume-rendering on acoustic grids.

The major advantage of the present invention is that it is not necessary to re-sample the data into a Cartesian geometry, and the present invention also performs much easier and faster calculations, thereby enabling the use of known shading and illumination models.

The method of the present invention comprises the steps of:
a) defining local coordinate systems at sample points of said volumetric data set,
b) calculating the gradient vector components (Gai, Gbi, Gci) within said local coordinate systems of said sample points,
c) transforming said external parameters from a global coordinate system into said local coordinate systems at selected sample points or at the points of a reference grid, and
d) using said gradient vector components (Gai, Gbi, Gci) for calculating a surface normal at a given position of said volumetric data set,
e) calculating the external parameters from said global coordinate system at said given position by using the transformed external parameters of said local coordinate systems at said selected sample points or points of a reference grid.

The external parameters preferably comprise position coordinates and/or vectors defining positions and/or directions, respectively, which determine the visualization (volume rendering) of the data set. The external parameters may for example be the position of one or several light sources, the observer position, and/or the light vector(s) used for the rendering, and/or the vector/direction of the observer.

As it is desired that these external parameters may be varied in real time, for example for visualizing the surface-structures from different observer directions, a fast algorithm as provided by the invention is important.

According to an embodiment, the volumetric data set has been acquired by a medical imaging technique, such as Ultrasound, Computed Tomography, Magnetic Resonance Imaging or Positron Emission Spectroscopy. The sample points are the points making up the data set.

The local coordinate systems are preferably coordinate systems which, at each sample point, are aligned with the coordinate system in which the volumetric data set is available, for example the acoustic coordinate system. Thus, the local coordinate systems are slightly different for each sample point, preferably they vary smoothly from sample point to sample point.

The global coordinate system is a coordinate system in which the position and orientation of the volumetric data set, and the external parameters required for the volume rendering step, such as the position of one or several light sources, the observer position, and/or the light vectors used for the rendering, and/or the direction of the observer, are all defined in one and the same coordinate system. It is usually a Cartesian coordinate system, but that is not a requirement.

By calculating the gradient vector components within said local coordinate systems of the sample points, it is not necessary to transform the sample points (and their respective gradient vector components) into a global Cartesian coordinate system. In fact, external parameters such as the light source or the position of the camera or observer are transformed from a global coordinate system into the local coordinate system of each or selected sample points. By defining such local coordinate system at the position to be shaded, such transformation of external parameters is possible.

A possible local coordinate system is the tangent space and is e.g. used for local bump-mapping calculations. Here, a perturbation to the surface normal of the object to be rendered is looked up in a texture map at each sample point and applied before the illumination calculation is done. Thereby, a richer, more detailed surface representation is obtained (see, for instance, Phong shading). Normal-mapping and parallax-mapping are the most commonly used bump mapping techniques. Here, the tangent space is often used for defining the local coordinate system.

In order to create a tangent space for a surface, it is necessary to calculate three perpendicular axes, namely T, B and N. T, the tangent vector, is parallel to the direction of increasing S or T on a parametric surface. N, the normal vector, is perpendicular to the local surface. B, the bi-normal, is perpendicular to both N and T and like T also lies on the surface. It is a "moving coordinate system" that is attached to the surface and moves along with the sample points to be shaded.

In the case of acoustic coordinates, the three perpendicular axes are preferably aligned with the three directions azimuth, elevation and range. For example, N may correspond to range, T to elevation and S to azimuth. Preferably, the local coordinate system at each sample point is aligned in the same way with the acoustic coordinates.

The present invention uses such technique wherein at each sample point the gradient vector components are calculated within the local coordinate systems of such sample point. Said sample points are preferably grid points of an acoustic grid which is a special coordinate system, as the ultrasound images are scanned and the local coordinate system is then defined at such sample points, for example in an at least 3-D coordinate system with perpendicular axes in the directions of an acoustic grid, e.g. range, elevation and azimuth. The calculation of the gradient vector components within said local coordinate system can for example be done by calculating the spatial derivatives in all dimensions, preferably by finite differencing of sample points, thereby using the discrete values of respective neighbouring sample points.

If a given position of said volumetric data set, which can be a sample point or some voxel in between these sample points, shall be illuminated, it is then possible to calculate the surface normal at such given position by using the gradient vector components of the sample points. The given position is a position at which it is desired to calculate the light reflection in order to produce a volume-rendered image. If the visualisation or volume-rendering process is done by a ray casting technique, the given position(s) will for example be on such ray, if a slice-based technique is used, the given position(s) will be the pixel positions on these slices. Most, if not all, of the given positions are usually not identical with the sample points, nor with the selected sample points or the points on a reference grid.

According to a preferred embodiment of the present invention, said surface normal at a given position is calculated by first interpolating non-normalized gradient vector components of neighbouring sample points and by then normalizing the interpolated gradient vector at such position.

When the surface normal at a given position shall then be calculated, it is possible in accordance with a preferred embodiment of the present invention to interpolate non-normalized gradient vector components of e.g. eight neighbouring sample points, wherein the sample points are neighboured to such given position in such three-dimensional (voxel) space. That will reduce the calculation to sample points only, while all other (voxel) positions are calculated by interpolating the gradient vector components of respective neighbouring sample points.

According to an important aspect of the present invention, not the normalized gradient vectors or the normal vectors of these sample points are interpolated to obtain respective gradient vectors at a given position, but the non-normalized gradient vector components are interpolated and the normalization is then performed afterwards at such given position.

According to an embodiment, such interpolation between gradient vector components of neighbouring sample points is done without accounting for the fact that the gradient vector components exist in different local coordinate systems. In other words, the interpolation is done as if the gradient vector components from all contributing sample points were in the same local coordinate system. This approximation can be done because, at least in acoustic coordinates, there are no sharp transitions in the geometric of the coordinate system, i.e. the orientation of the local coordinate systems of neighbouring sample points differs only slightly. The situation would be different if sample points which are far away from each other had to be compared, but as this is not the case, the inaccuracies resulting from this procedure do not impair the result.

According to another aspect of the present invention, the light source (and other external parameters) is then transformed into such local coordinate system at some points of the three-dimensional data grid. These points may be selected sample points, or they may be points of a reference grid which is defined within the acoustic grid but need not match the sample points of the acoustic grid. According to an embodiment of the invention, the conversion/transformation of the external parameters into the local coordinate systems is not done at every sample point, as that would be very calculation intensive, but only at some selected points of the data set, for example at every $3^{rd}$ to $50^{th}$ sample point in each dimension, or at points of a pre-defined reference grid, wherein the reference grid may have a resolution which is less than the resolution of the sample points, for example about 5 to 30 times less.

The transformation of the external parameters into the local coordinate system of a sample point or the point on a reference grid is done e.g. by calculating a transformation matrix between the global coordinate system and the respective local coordinate system, and by mapping the external coordinates into the local coordinate system at the sample point or the reference point.

It is then possible, according to a preferred embodiment of the present invention, to calculate the external parameters from said global coordinate system at said given position also by using the transformed external parameters of said local coordinate system of the selected sample points or of the points of the reference grid, preferably of neighbouring selected sample points or points of the reference grid. That will further reduce the calculation time as it is then not necessary to calculate a transformation of external parameters into local coordinate systems at each given position, but it is only necessary to do such calculation for certain sample points within said three-dimensional (acoustic) data grid. As stated above, these sample points can also be grid points of a predefined reference grid as described in US 2005/0253841 A1. Thus, according to an embodiment, the transformation from Cartesian (global coordinate system) to acoustic (local coordinate system) geometry is not done for every sample point, but at a much coarser level.

According to an embodiment, the external parameters at the given positions are then interpolated from closest sample points or points of the reference grid, for which the external parameters have been transformed into the local coordinate systems. This is an approximation, but again since there is no sharp transition in the geometry, a sufficiently smooth result is obtained using interpolation.

According to another preferred aspect of the present invention, the shading of a given position is done by a conventional illumination model, wherein the surface normal at said given position is used as well as the calculated external parameters from said global coordinate system at said given position.

In accordance with the present invention, it is possible to use a volumetric data set which is derived from sampled raw ultrasound data, wherein said gradient vector components within the local coordinate systems are calculated from each sample point of the raw ultrasound data and stored together with the scalar value of the sample point in a new data set containing 4-tupl vectors ($G_a$, $G_b$, $G_C$, F). For any given position, these gradient vector components and such scalar value of neighbouring sample points are then used for calculating a surface normal at the given position. Thereafter, the transformed external parameters of the local coordinate system of said sample points are used for calculating the external parameters at the given position and the given position may then be illuminated by a conventional illumination model by using the calculated external parameters and the calculated surface normal. A conventional Blinn-Phong illumination model can be used, since the relevant factors such as surface normal, light vector, viewers vector, half-normal or the reflection vector are existent in the local coordinate system of each sample point and interpolated for each given position.

According to the present invention, the sampled raw ultrasound data is first transferred to a graphics processing unit and then computed there, using a shader, wherein the transforming of external parameters from a global coordinate system into a local coordinate system is e.g. performed by the graphic processing unit of an ultrasound computer system. The gradient vector components within the local coordinate systems are then calculated by using central differences, sobel operators or other estimators.

The present invention also relates to a device for visualizing surface-like structures in volumetric data sets with
  a) a first processing unit for defining local coordinate systems at sample points of said volumetric data set and for
  b) transforming external parameters from a global coordinate system into said local coordinate systems, and
  c) a second processing unit for calculating the gradient vector components within said local coordinate systems of said sample points and for
  d) using said gradient vector components for calculating a surface normal at a given position of said volumetric data set.

Both processing units (PU1, PU2) are preferably graphic processing units which will help the CPU to minimize processing time needed for the illumination or shading. The graphics processing unit displays the given position, which is illuminated by a conventional illumination model, by using the calculated external parameters and the calculated surface normal in a Cartesian coordinate system which is usually identical to the display screen domain. Here, the graphics processing unit is usually also calculating the external parameters from the global coordinate system at the given position by interpolating the transformed external parameters of the local coordinate systems of neighbouring sample points in order to obtain the relevant transformed and interpolated external parameters at such local grid points, which are either points of the acoustic grid (or points in between these grid points) or points of a reference grid as described in US 2005/0253841 A1.

US 2005/0253841 A1 discloses the deformation of a reference grid (coordinate system) as a function of a cut plane which is defined within the three-dimensional data set. US 2005/0253841 A1 proposes to use the intersection points of a cut plane with a proxy geometry representing a scan volume wherein a vertex processor of a graphic processing unit then deforms the reference grid and determines Cartesian coordinates and the texture coordinates for respective grid points of the reference grid. However, for the present invention, it is not necessary to transform grid points into Cartesian coordinates.

The present invention also relates to a computer program product which comprises a program code which is stored on a computer readable media and which performs the above described method, if such computer program product is run on a computer.

BRIEF DESCRIPTION OF THE DRAWINGS

Preferred embodiments of the present invention are further described by way of describing the accompanied drawings.

DETAILED DESCRIPTION

Figure 1:
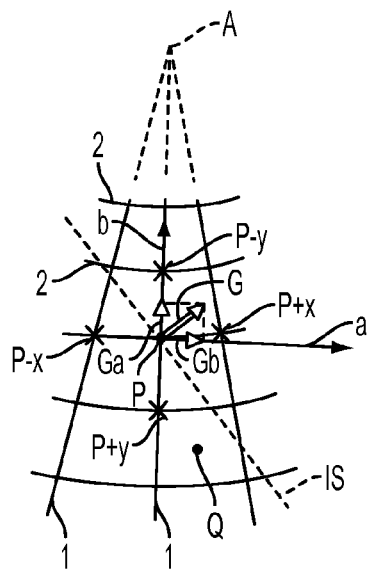
FIG. 1 shows a common acoustic grid with a local coordinate system at a sample point P.

FIG. 1 shows a conventional ultrasound (acoustic) grid with an apex A, beams 1 and rows 2, wherein beams 1 and rows 2 represent the acoustic coordinate system (e.g. range and azimuth, respectively) in a two-dimensional representation. The third dimension, e.g. the elevation of a spherical coordinate system, is not shown in FIG. 1 for better understanding of the present invention.

As described above, the local gradient vector G is defined by local gradient vector components $G_a$ and $G_b$ of a sample point P, wherein these components may be calculated by a differencing scheme as mentioned above.

Figure 2:
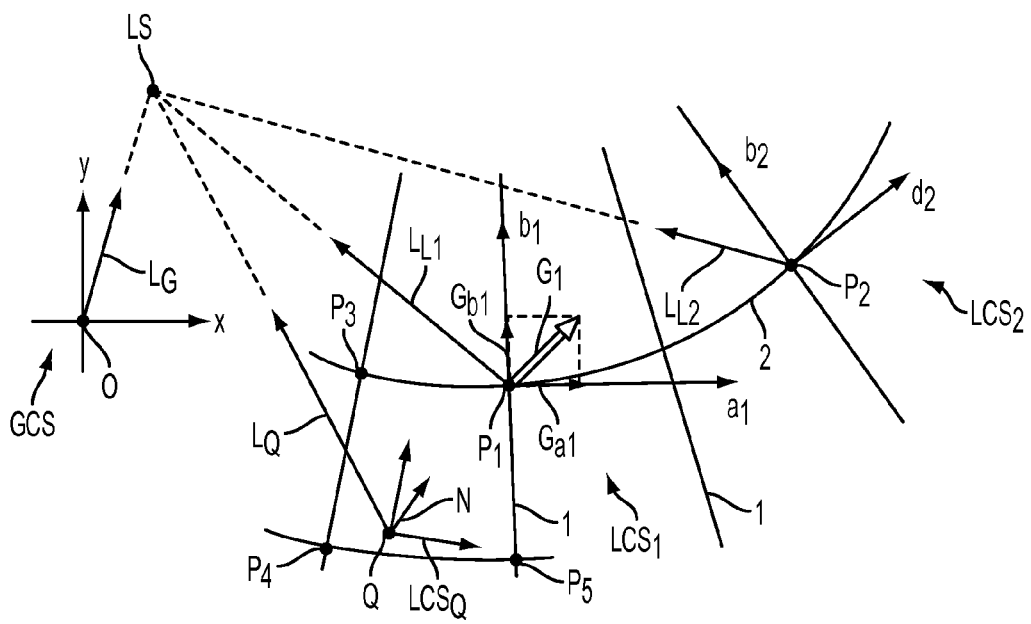
FIG. 2 shows the transformation of external parameters from a global coordinate system into local coordinate systems as well as the schematic calculation of a local light vector $L_Q$ at a given position Q.

FIG. 2 schematically shows the transformation of an external parameter, such as a light source LS, from a global coordinate system GCS into local coordinate systems, namely a first local coordinate system $LCS_1$ and a second local coordinate system $LCS_2$, which are defined at a first sample point $P_1$ and a second sample point $P_2$ in an acoustic grid as shown in FIG. 1.

Each sample point $P_i$ has a local gradient vector $G_i$ with local gradient vector components $G_{ai}$ and $G_{bi}$. The first sample point $P_1$ has a first gradient vector component $G_{a1}$ and a second gradient vector component $G_{b1}$, wherein axis of the first local coordinate system $LCS_1$ is in parallel to beam 1, while the second local coordinate system axis $a_1$ is the tangent vector of row 2 and perpendicular to the first coordinate system axis $b_1$.

The first local gradient vector $G_1$ is defined by using neighbouring sample points (such as sample point $P_2$ or other sample points), thereby using well-known differencing schemes such as central differencing schemes (Formula 1), discrete convolution filters such as a sobel filter or continuous convolution filters such a cubic B-spline and its derivatives (4×4×4 neighbours).

FIG. 2 also displays a global coordinate system GCS with axes x and y and the light vector $L_G$ given in such global coordinate system GCS. Instead of re-sampling sample points $P_1$, $P_2$ into the global coordinate system GCS, the light source LS is transformed into the local coordinate systems $LCS_1$ and $LCS_2$, thereby obtaining a first local light vector $L_{L1}$ and a second local light vector $L_{L2}$. According to an embodiment, the external parameters, such as the light source, are not transformed into the local coordinate system of every sample point, but only into those of a coarser grid of sample points, or into the local coordinate systems of the points of a reference grid.

FIG. 2 also displays a given position Q, wherein the local light vector $L_Q$ of such given position Q is not necessarily calculated by transforming the light source LS into the local coordinate system $LCS_Q$ of the given position Q but such light vector $L_Q$ is preferably calculated by using the first local light vector $L_{L1}$ and the second local light vector $L_{L2}$ of sample points $P_1$ and $P_2$ and possibly further local light vectors of further sample points, if necessary. The external parameters are hence transformed into the local coordinate system $LCS_Q$ of the given position Q by interpolating already transformed external parameters from certain neighbouring sample points of the acoustic grid or said reference grid.

Similarly, the normal vector N of a given position Q is calculated by using the gradient vector components $G_{a1}$, $G_{b1}$ and $G_{c1}$ of the first sample point $P_1$ as well as gradient vector components $G_{a2}$, $G_{b2}$ and $G_{c2}$ of the second sample point $P_2$ (not shown), so it is not necessary to calculate the vectors necessary for the illumination models at each given position by transforming coordinate systems or external parameters but it is only necessary to calculate the transformation of external parameters at discrete sample points and to obtain the surface normal N (and other vectors) by interpolating the non-normalized gradient vector components of respective sample points Pi at a given position Q. Again, the external parameters are transformed into the local coordinate system $LCS_Q$ of the given position Q by interpolating already transformed external parameters from certain neighbouring sample points of the acoustic grid or said reference grid.

That way, computation costs can be reduced by computing the light source LS only in local space and only at the grid points of the acoustic grid or a reference grid and using linear interpolation for in-between points or pixels. Thereby, it is possible to reduce a large part of the transformation calculation costs because of a much coarser grid.

The present invention uses a reduced computation model by transforming the external parameters only at some or all points of a grid (acoustic grid, reference grid or part or a combination of these grids), thereby accepting that the values at each given position (at each voxel within the three-dimensional Cartesian voxel space) are interpolated. Since such interpolation results are used only for illumination calculation, it is believed that this is a legitimate approximation. The human eye is very sensitive to high-frequency changes in illumination (e.g. a sharp edge or hard cut-off is easily visible). However, since there is no sharp transition in the geometry, it is possible to obtain a pretty smooth result by using the interpolation techniques of the present invention. The human eye will normally not notice any difference in the illumination result.

Figure 3:
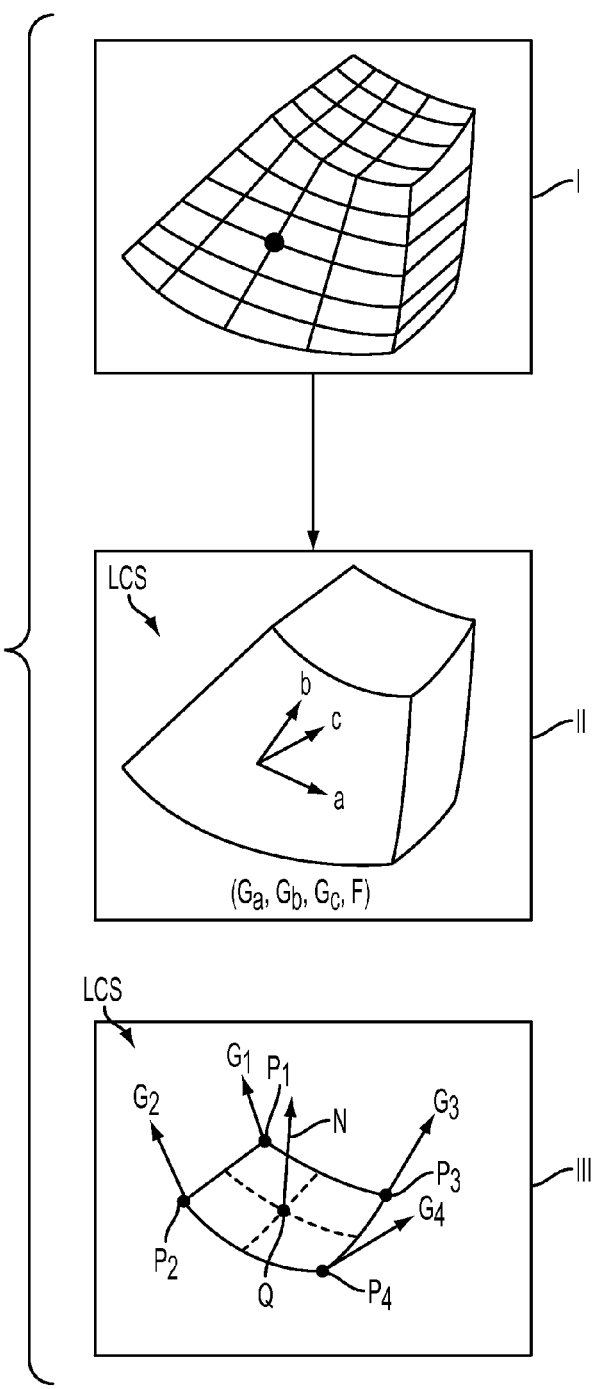
FIG. 3 shows the implementation of the present invention for real-time application by calculating the surface normal through interpolation of gradient vector components.

FIG. 3 shows another preferred embodiment of the present invention for real-time applications such as life three-dimensional ultrasound scanning. The gradient computation often becomes a bottleneck when real-time applications are necessary. Currently, the pre-process gradients are computed on the CPU and transferred unto the GPU afterwards. According to the present invention it is now possible to transfer the original raw data and perform the pre-computation in a rendering step.

Latest hardware existent supports such rendering to individual slices of a three-dimensional volume texture.

Raw data as shown in step I of FIG. 3 is first transferred onto the GPU in its native format (e.g. 8 bits per sample). In a second step II, each sample is iterated and the gradient is computed. Central differences, sobel operators or any other estimator can be used. Thereafter, the un-normalized gradient component ($G_a$, $G_b$, $G_c$, F) are stored in a new three-dimensional volume as shown schematically in FIG. 3. Here, it is preferable to use a higher precision (e.g. 16 or 32 bit floats) in order to avoid any quantization artifacts.

According to the invention it is advantageous not to implement pre-computed gradients normalized at this stage, but to store the gradient vector components non-normalized instead.

As shown in step III in FIG. 3, the surface normal N at a given position Q is calculated by interpolating the gradient vector components of gradient $G_1$ of a first sample point $P_1$, gradient $G_2$ of a second sample point $P_2$, gradient $G_3$ of a third sample point $P_3$ and gradient $G_4$ of a fourth sample point $P_4$. Each gradient has respective gradient vector components which are all used to define the gradient vector at the given position Q, which is only then normalized to obtain the surface normal N.

The present invention has the advantage that the method used fits well with reference-grid implementations, as there is less work load in the pixel-shader stage which results in a high performance, real-time gradient rendering. Furthermore, all lighting calculation is done in the local coordinate systems. The gradient volume in the acoustic space can be pre-computed and stored so that illumination is sped-up.

The invention claimed is:

1. Method for visualizing surface-like structures in volumetric data sets, wherein the visualization is determined by a set of external parameters comprising at least one of position coordinates and directions defining the visualization, the method comprising the steps of
    a) defining local coordinate systems at sample points of said volumetric data set, the local coordinate systems being different for each sample point, and the sample points defining a first resolution,
    b) calculating, by a graphic processing unit, gradient vector components (Gai, Gbi, Gci) within said local coordinate systems of said sample points, the calculation performed at the first resolution,
    c) transforming, by the graphic processing unit, said external parameters from a global coordinate system into said local coordinate systems at selected sample points or at points of a reference grid, the selected sample points or points of the reference grid defining a second resolution less than the first resolution
    d) using said gradient vector components in said local coordinate system of said sample points for calculating, by the graphic processing unit, a surface normal at a given position of said volumetric data set which is to be shaded, without transforming said gradient vector components to the global coordinate system, and
    e) calculating, by the graphic processing unit, external parameters from said global coordinate system at said given position by interpolating between the transformed external parameters of said local coordinate systems at said selected sample points or points of a reference grid.

2. Method as claimed in claim 1, wherein said surface normal at said given position is calculated by first interpolating non-normalized gradient vector components of neighbouring sample points and by then normalizing the interpolated gradient vector at such position.

3. Method as claimed in claim 1, wherein,
    said sample points are grid points of an acoustic grid and said local coordinate systems have at least three orthogonal axes.

4. Method as claimed in claim 1, wherein,
    said given position is a position in between sample points, and said surface normal at said given position is calculated by interpolating non-normalized gradient vector components of at least eight neighbouring sample points.

5. Method as claimed in claim 1, further comprising
    calculating said gradient vector components within said local coordinate systems of said sample points by calculating spatial derivatives in all dimensions by finite differencing.

6. Method as claimed in claim 1, wherein the external parameters from said global coordinate system at said given position are calculated by interpolating between the transformed external parameters from closest selected sample points or closest points of the reference grid.

7. Method as claimed in claim 1, further comprising
    g) shading said given position by a conventional illumination model, thereby using said surface normal at said given position and said calculated external parameters from said global coordinate system at said given position.

8. Method as claimed in claim 1, wherein,
    said volumetric data set is derived from sampled, raw ultrasound data,
    said gradient vector components within said local coordinate systems are calculated for each sample point of said raw ultrasound data and stored together with a scalar value of said sample point in a new data set,
    for any given position, said gradient vector components and said scalar values of neighbouring sample points are used for calculating a surface normal at said given position,
    said transformed external parameters of said local coordinate systems of said selected sample points or points of a reference grid are used for calculating the external parameters at said given position, and
    said given position is illuminated by a conventional illumination model by using said calculated external parameters and said calculated surface normal.

9. Method as claimed in claim 8, wherein the sampled, raw ultrasound data is first transferred to a graphics processing unit and then computed there, using a vertex shader, wherein said transforming of external parameters from a global coordinate system into said local coordinate systems is performed by a processing unit of an ultrasound computer system.

10. Method as claimed in claim 1, wherein, said gradient vector components within said local coordinate systems are calculated using central differences, sobel operators, or other estimators.

11. A method as claimed in claim 1, wherein said surface normal at said given position is calculated by interpolating said gradient vector components of neighbouring sample points, without transforming said gradient vector components to said global coordinate system.

12. Device for visualizing surface-like structures in volumetric data sets, comprising:
    a) a first processing unit for defining local coordinate systems at sample points of said volumetric data set, the local coordinate systems being different for each sample point, and the sample points defining a first resolution, and for b) transforming external parameters from a global coordinate system into said local coordinate systems at selected sample points or points of a reference grid, the selected sample points or points of the reference grid defining a second resolution less than the first resolution, and for c) calculating external parameters from said global coordinate system at a given position, which is to be shaded, by interpolating between the transformed external parameters of said local coordinate systems at said selected sample points or points of a reference grid, d) a second processing unit for calculating the gradient vector components within said local coordinate systems of said sample points, the calculation performed at the first resolution, and for e) using said gradient vector components in said local coordinate systems of said sample points for calculating a surface normal at a given position of said volumetric data set, without transforming said gradient vector components to the global coordinate system.

13. Device as claimed in claim 12, wherein,
one of said first and second processing units displays said given position, which is illuminated by a conventional illumination model by using said calculated external parameters and said calculated surface normal, in a Cartesian coordinate system, in the course of a 3-D volume rendering.

14. Device as claimed in claim 12, wherein,
one of said first and second processing units is further configured to calculate the external parameters from said global coordinate system at said given position by interpolating between transformed external parameters of closest selected sample points or closest points of the reference grid.

15. The device as claimed in claim 12, wherein said surface normal at said given position is calculated by interpolating said gradient vector components of neighbouring sample points, without transforming said gradient vector components to said global coordinate system.

16. A non-transitory computer program product comprising a program code which is stored on a non-transitory computer readable media and which performs the method as claimed in claim 1 if run on a computer including the graphic processing unit.

* * * * *